(12) United States Patent
Lin et al.

(10) Patent No.: US 11,625,099 B2
(45) Date of Patent: Apr. 11, 2023

(54) SYSTEMS AND METHODS FOR DEVELOPING BRAIN COMPUTER INTERFACE

(71) Applicants: Tzu-Hsiang Lin, Miami, FL (US); Zachary Danziger, Miami, FL (US)

(72) Inventors: Tzu-Hsiang Lin, Miami, FL (US); Zachary Danziger, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/811,648

(22) Filed: Jul. 11, 2022

(65) Prior Publication Data
US 2023/0029057 A1    Jan. 26, 2023

Related U.S. Application Data

(60) Provisional application No. 63/225,761, filed on Jul. 26, 2021.

(51) Int. Cl.
*G06N 3/08* (2023.01)
*G06F 3/01* (2006.01)

(52) U.S. Cl.
CPC .............. *G06F 3/015* (2013.01); *G06F 3/014* (2013.01); *G06F 3/017* (2013.01); *G06N 3/08* (2013.01)

(58) Field of Classification Search
CPC .......... G06F 3/015; G06F 3/014; G06F 3/017; G06N 3/08
See application file for complete search history.

(56) References Cited

U.S. PATENT DOCUMENTS 9,717,440 B2 * 8/2017 Abdelghani ........... A61B 5/369

OTHER PUBLICATIONS

Golub et al., "Motor cortical control of movement speed with implications for brain-machine interface control", Apr. 9, 2014, J Neurophysiol 112, pp. 411-429. (Year: 2014).*

Pandarinath et al., "Inferring single-trial neural population dynamics using sequential auto-encoders", Oct. 2018, Nature Methods vol. 15, pp. 1-21 (page number based on order of each page, see office action). (Year: 2018).*

Miller et al., "Prediction of Finger Flexion 4th Brain-Computer Interface Data Competition", 2008, pp. 1-2. (Year: 2008).*

Yeganegi et al., "Decoding hind limb kinematics from neuronal activity of the dorsal horn neurons using multiple level learning algorithm", Jan. 12, 2018, Scientific Reports | (2018) 8:577, pp. 1-12. (Year: 2018).*

Hochberg et al., "Reach and grasp by people with tetraplegia using a neurally controlled robotic arm", May 17, 2012, Nature vol. 485, pp. 372-375 and supplemental pages regarding "Methods". (Year: 2012).*

(Continued)

*Primary Examiner* — Ying Yu Chen
(74) *Attorney, Agent, or Firm* — Saliwanchik, Lloyd & Eisenschenk

(57) ABSTRACT

Systems, methods, and protocols for developing invasive brain computer interface (iBCI) decoders non-invasively by using emulated brain data are provided. A human operator can interact in real-time with control algorithms designed for iBCI. An operator can provide input to one or more computer models (e.g., via body gestures), and this process can generate emulated brain signals that would otherwise require invasive brain electrodes to obtain.

15 Claims, 3 Drawing Sheets

(56) References Cited

OTHER PUBLICATIONS

Thomas et al., "Simultaneous classification of bilateral hand gestures using bilateral microelectrode recordings in a tetraplegic patient", Jun. 5, 2020, medRxiv, pp. 1-20. (Year: 2020).*

Mündermann et al., "The evolution of methods for the capture of human movement leading to markerless motion capture for biomechanical applications", Mar. 15, 2006, Journal of NeuroEngineering and Rehabilitation 2006, 3:6, pp. 1-11. (Year: 2006).*

Liu et al., "A new IMMU-based data glove for hand motion capture with optimized sensor layout", Mar. 4, 2019, International Journal of Intelligent Robotics and Applications (2019) 3, pp. 19-32. (Year: 2019).*

Danziger, Zachary, An Intracortical Brain-Computer Interface Model for High Efficiency Development of Closed-Loop Neural Decoding Algorithms, Abstract Text, https://reporter.nih.gov/project-details/9817780, 2019.

\* cited by examiner

SYSTEMS AND METHODS FOR DEVELOPING BRAIN COMPUTER INTERFACE

CROSS-REFERENCE TO RELATED APPLICATION

The application claims the benefit of U.S. Provisional Application Ser. No. 63/225,761, filed Jul. 26, 2021, which is hereby incorporated by reference herein in its entirety, including any figures, tables, and drawings.

GOVERNMENT SUPPORT

This invention was made with government support under 1R01NS109257-01A1 awarded by National Institute of Health (NIH). The government has certain rights in the invention.

BACKGROUND

A typical invasive brain computer interface (iBCI) translates brain data into commands for controlling output devices using a neural decoder (an algorithm that translates brain data into device commands). The decoder is developed by analyzing the brain data acquired by implanted electrodes. Acquiring more brain data helps to develop better decoders, but recruiting participants with implanted electrodes (or willing to have electrodes implanted in their brain) in the brain is difficult.

BRIEF SUMMARY

In view of the limitations in the related art, embodiments of the subject invention provide novel and advantageous systems, methods, and protocols for developing invasive brain computer interface (iBCI) decoders non-invasively by using emulated brain data. A human operator can interact in real-time with control algorithms designed for iBCI that in the related art have only been possible for paralyzed people willing to have electrodes implanted in their brains. An operator can provide input (e.g., via body gestures) to one or more computer model(s), and this process can generate emulated brain signals that would otherwise require invasive brain electrodes to obtain. In this way, iBCIs can be designed and/or tested at a much faster rate by having hundreds of operators test the iBCIs for extremely low cost, instead of relying on one or two end-users of iBCIs that are willing to test them using invasive brain-penetrating electrodes.

In an embodiment, a system for non-invasively developing a decoder of an iBCI can comprise: a motion capture device; a processor in operable communication with the motion capture device; and a (non-transitory) machine-readable medium in operable communication with the processor and having instructions stored thereon that, when executed by the processor, perform the following steps: receiving kinematic data (e.g., body gesture data) of a user from the motion capture device; utilizing an artificial neural network (ANN) to generate emulated neuron firing rates associated with the kinematic data; and translating the emulated neuron firing rates to corresponding control commands for an external device of the iBCI, thereby obtaining the decoder (i.e., the decoder is configured to provide translated control commands to the external device of the iBCI from the emulated neurons). The motion capture device can be, for example, a data glove, and the kinematic data can comprise hand gesture kinematic data of the user. The kinematic data can be real-time kinematic data of the user using the motion capture device. The ANN can be a trained ANN that has been trained (prior to receiving the real-time kinematic data) using training kinematic data and real neuron firing rates associated with the training kinematic data. The training kinematic data can comprise data from many different recording sessions using invasive electrodes across multiple different implanted subjects (either human or animal), such as at least 20 different training sessions (e.g., at least 22 different training sessions). The training kinematic data can comprise data for any sufficient number of actualized body gestures or imagined actions concurrent with or recorded together with the real neuron firing rates (e.g., at least eight different body gestures), and the real neuron firing rates can be respectively associated with the at least eight different body gestures. The training kinematic data can be training hand gesture kinematic data and the real neuron firing rates can be associated with the training hand gesture kinematic data. The training hand gesture kinematic data can comprise data for at least eight different hand gestures, and the real neuron firing rates can be respectively associated with the at least eight different hand gestures. The trained ANN can be an ANN that was trained using a transfer learning technique (as disclosed herein) to accommodate use of data from multiple recording sessions. The ANN can comprise an input layer, an output layer, and four hidden layers (e.g., a first hidden layer, a second hidden layer, a third hidden layer, and a fourth hidden layer). The input layer can comprise, for example, 95 nodes; the first hidden layer can comprise, for example, 150 nodes; the second hidden layer can comprise, for example, 100 nodes; the third hidden layer can comprise, for example, 50 nodes; and the fourth hidden layer can comprise, for example, 30 nodes. The external device of the iBCI can be, for example, a robot arm, a wheelchair, a keyboard, a smart device (e.g., a smartphone or smart tablet), or a computer (e.g., a laptop computer or a desktop computer). The system can further comprise the external device of the iBCI.

In another embodiment, a method for non-invasively developing a decoder of an iBCI can comprise: using, by a user, a motion capture device to capture kinematic data of the user; receiving (e.g., by a processor in operable communication with the motion capture device) the kinematic data of the user; utilizing (e.g., by the processor) an ANN to generate emulated neuron firing rates associated with the kinematic data; and translating (e.g., by the processor) the emulated neuron firing rates to corresponding control commands for an external device of the iBCI, thereby obtaining the decoder. The motion capture device can be, for example, a data glove, and the kinematic data comprising hand gesture kinematic data of the user. The kinematic data can be real-time kinematic data of the user using the motion capture device. The ANN can be a trained ANN that has been trained (prior to receiving the real-time kinematic data) using training kinematic data and real neuron firing rates associated with the training kinematic data. The training kinematic data can comprise data from many different recording sessions using invasive electrodes across multiple different implanted subjects (either human or animal), such as at least 20 different training sessions (e.g., at least 22 different training sessions). The training kinematic data can comprise data for any sufficient number of actualized body gestures or imagined actions concurrent with or recorded together with the real neuron firing rates (e.g., at least eight different body gestures), and the real neuron firing rates can be respectively associated with the at least eight different body gestures. The training kinematic data can be training hand gesture kinematic data and the real neuron firing rates can be associated with the training hand gesture kinematic data. The training hand gesture kinematic data can comprise data for at least eight different hand gestures, and the real neuron firing rates can be respectively associated with the at least eight different hand gestures. The trained ANN can be an ANN that was trained using a transfer learning technique (as disclosed herein) to accommodate use of data from multiple recording sessions. The method can further comprise, before using the motion capture device to capture (real-time) kinematic data of the user, training the ANN by using recording sessions with invasive electrodes across multiple different implanted subjects (human or animal) and pairing the motions of the subjects with the real neuron firing rates. A transfer learning technique (as disclosed herein) can be used for the training. The ANN can comprise an input layer, an output layer, and four hidden layers (e.g., a first hidden layer, a second hidden layer, a third hidden layer, and a fourth hidden layer). The input layer can comprise, for example, 95 nodes; the first hidden layer can comprise, for example, 150 nodes; the second hidden layer can comprise, for example, 100 nodes; the third hidden layer can comprise, for example, 50 nodes; and the fourth hidden layer can comprise, for example, 30 nodes. The external device of the iBCI can be, for example, a robot arm, a wheelchair, a keyboard, a smart device (e.g., a smartphone or smart tablet), or a computer (e.g., a laptop computer or a desktop computer). The method can further comprise providing the corresponding control commands to the external device of the iBCI.

DETAILED DESCRIPTION

Figure 1:
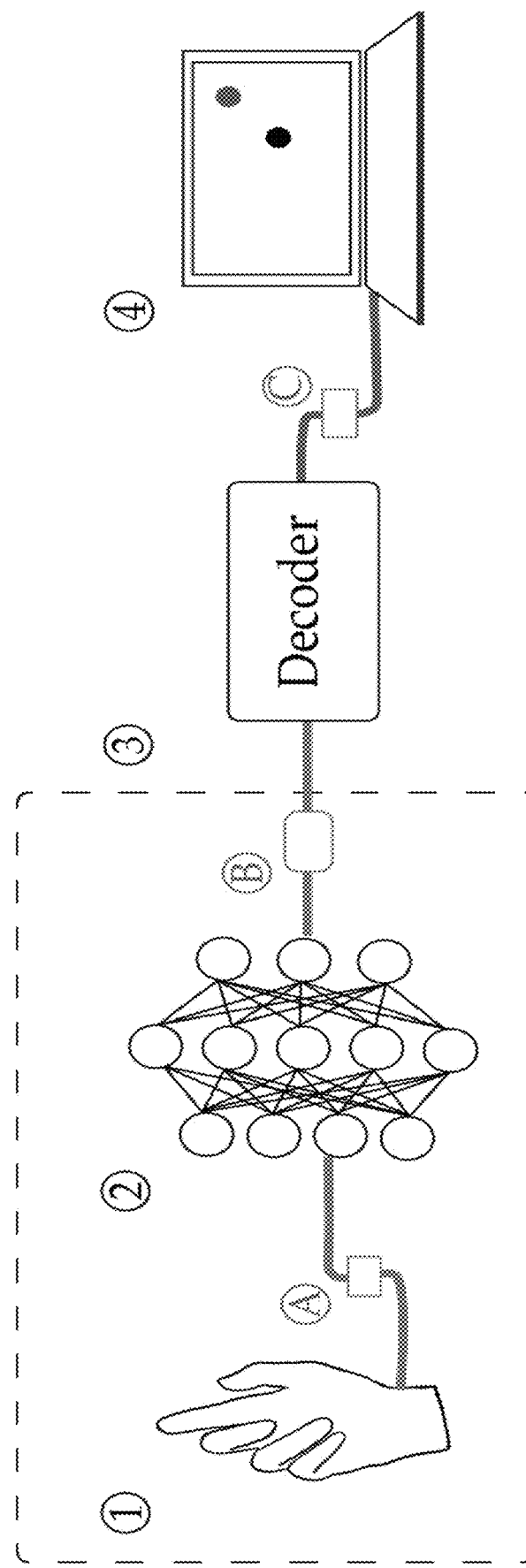
FIG. 1 shows a schematic view of a system for developing a brain computer interface, according to an embodiment of the subject invention. Element 1 and element 2 are main components of the system. An important contribution of the system is to provide an efficient protocol to develop the decoder (labeled "3").

Embodiments of the subject invention provide novel and advantageous systems, methods, and protocols for developing invasive brain computer interface (iBCI) decoders non-invasively by using emulated brain data. A human operator can interact in real-time with control algorithms designed for iBCI that in the related art are only been possible for paralyzed people willing to have electrodes implanted in their brains. An operator can provide input to one or more computer model(s) (e.g., via body gestures), and this process can generate emulated brain signals that would otherwise require invasive brain electrodes to obtain. In this way, iBCIs can be designed and/or tested at a much faster rate by having hundreds of operators test the iBCIs for extremely low cost, instead of relying on one or two end-users of iBCIs that are willing to test them using invasive brain-penetrating electrodes.

Typical iBCIs require implanting electrodes in the brain to acquire brain data for developing decoders. The biggest challenge in developing decoders is recruiting people willing to undergo this highly invasive implantation procedure. In order to solve this problem, embodiments of the subject invention use human operators (with no implanted electrodes required; i.e., the procedure is non-invasive) interacting with machine learning techniques to generate abundant emulated brain data to develop decoders.

The emulated brain data can be generated via the interaction of a healthy human operator (with no implanted electrodes required; i.e., the procedure is non-invasive) interacting with an artificial neural network (ANN). The ANN can be trained with kinematics (e.g., hand kinematics or any other type, including imagined kinematics) and real brain data recorded by invasive sensors. The ANN can learn the relationship between the hand kinematics data and the real brain data. After training, the ANN can generate emulated brain data by processing new hand kinematics data given to it as an input. The ANN has been validated (see Example 1) to ensure the emulated brain data are similar to real brain data.

The ANN can generate emulated brain data by taking hand kinematics data as input. The kinematics data can be acquired by different devices (e.g., a data glove or a motion capture system).

Embodiments of the subject invention provide alternative options (i.e., alternative to invasive options) for developing iBCI decoders. This is accomplished non-invasively by using emulated brain data. A process of using this technology to develop an iBCI decoder for controlling a computer cursor can include the following. First, the task can be defined (e.g., moving the cursor to click a shortcut icon on a display). Second, the task performance metric(s) can be defined (e.g., time to finish the task). Third, at least one type of decoder can be selected (e.g., two types of decoders, such as comparing position Kalman filter and velocity Kalman filter). Fourth, an experiment can be designed (e.g., 30 participants in each group, with each participant performing 100 trials of the task). Fifth, the experiment can be performed with emulated brain data. Sixth, the results can be interpreted to get to the finding (e.g., the average time is shorter when using velocity Kalman filter). Seventh, the decoder (e.g., velocity Kalman filter) can be applied to a real iBCI.

Embodiments of the subject invention allow an iBCI developer to perform experiments with more participants, which is not possible for conventional iBCIs. This not only speeds up the development process but also lets the developer test many decoders. Embodiments therefore help to advance the application of iBCIs.

FIG. 1 shows a schematic view of a system for developing a brain computer interface, according to an embodiment of the subject invention. Referring to FIG. 1, element 1 and element 2 are two of the main components of the system. An important contribution of the system is to provide an efficient protocol to develop the decoder (labeled "3"). Element 1 is a data glove or a motion capture system, which can have sensors (e.g., 19 sensors or at least 19 sensors) to register real-time hand gesture kinematics and send to the ANN (labeled "2"). Though FIG. 1 shows a data glove, this is for exemplary purposes only and should not be construed as limiting. The ANN can be trained (e.g., before being connected with the data glove) on hand kinematics and/or real neuron firing rate. The ANN can take hand kinematics as input (e.g., while connected to the data glove) and generate emulated neuron firing rates. The decoder (labeled "3") can translate real-time emulated neuron firing rates to control command(s). A main innovation of embodiments is to provide an efficient protocol to test different algorithms for the decoder. The external device (labeled "4") is the end effector of the brain computer interface. The external device can be, for example, a robot arm, a wheelchair, a keyboard, or a computer (e.g., a laptop). Though FIG. 1 shows a laptop as the external device, this is for exemplary purposes only and should not be construed as limiting.

Referring still to FIG. 1, reference "A" represents hand gesture kinematics (e.g., multi-dimensional time series hand gesture kinematics of the hand). Hand gesture kinematics can be recorded by the data glove (or other motion capture system) and sent to the ANN as the input. Reference "B" represents emulated neuron firing rates (e.g., emulated firing rate(s) of the primary motor cortex). Reference "C" represents control command (e.g., the command to control the external device). For example, to control a computer cursor, the command can be a 2-vector of velocity in the x direction and velocity in the y direction. The format of the command depends on the external device.

Embodiments of the subject invention can use hand gesture kinematics to generate emulated neuron firing rates. The ANN can be trained (e.g., on a plurality of different hand gestures (e.g., 8 different hand gestures). In real-time application, the ANN can take any hand gesture(s) and generate emulated neuron firing rates. The ANN can learn the general mapping between the hand gestures and neuron firing rates. The selected different hand gestures (e.g., 8 different hand gestures) can be verified if desired (e.g., through principal component analysis) to make sure the hand gestures are distinctive.

The input data of the ANN can be recorded (e.g., from one or more mammalian subjects, such as human subjects and/or primate subjects (e.g., one or more rhesus monkeys (e.g., two rhesus monkeys))). Multiple sessions (e.g., 22 sessions) can be performed with different numbers of neurons recorded (e.g., ranging from 23-93 neurons). Neuron firing rates can be recorded when the subject(s) perform different arm movements (e.g., 8 different arm movements) for multiple trials in each session. Each arm movement can be paired with a hand gesture as the input-output to train the ANN.

Figure 2:
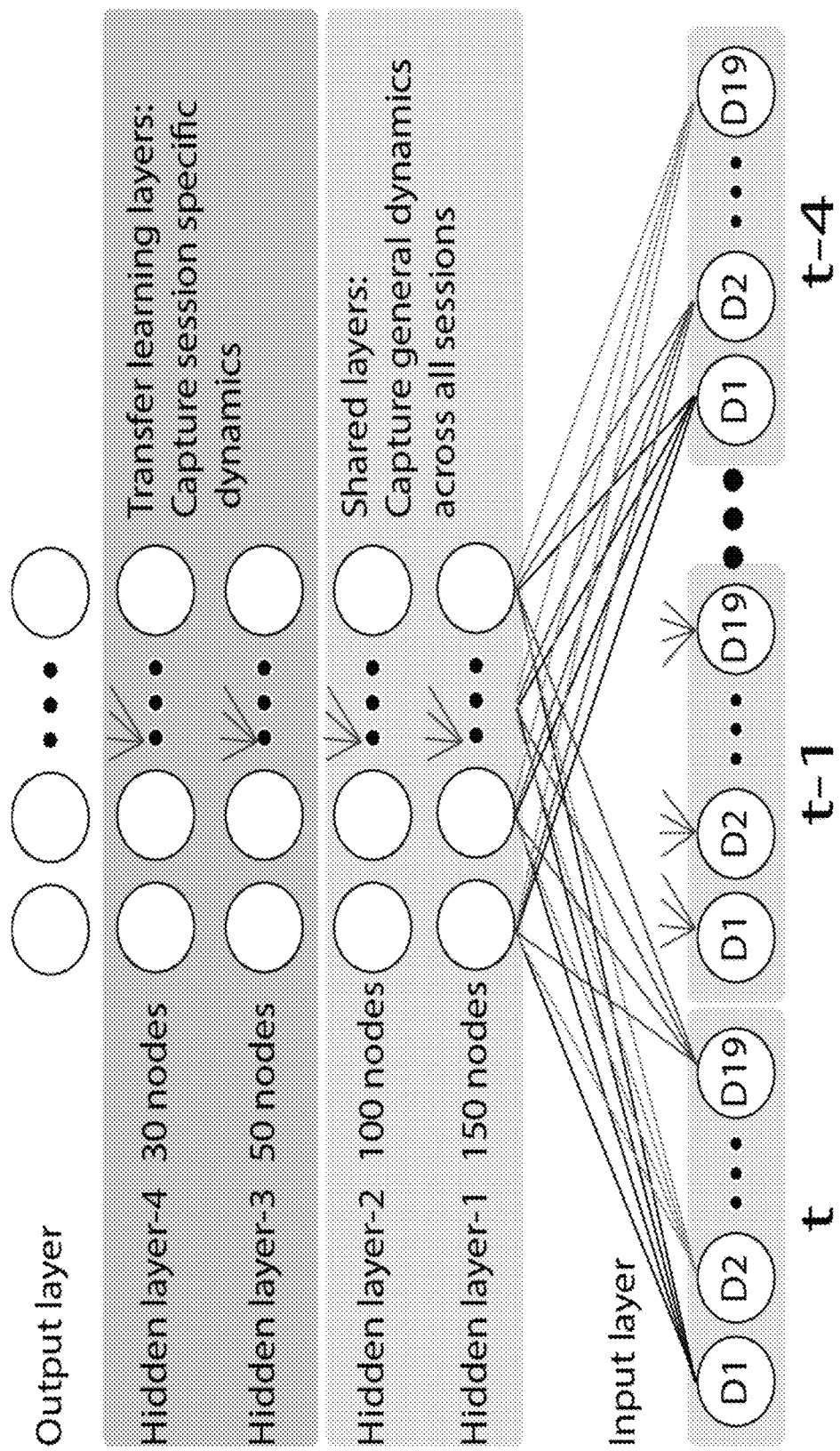
FIG. 2 shows the architecture of an artificial neural network (ANN), according to an embodiment of the subject invention. At time t, the input layer had the data from time t plus four previous time steps. The total number of nodes is 19×5=95 nodes, and each node is connected to all the nodes in hidden layer-1. There are 4 hidden layers of 150, 100, 50, and 30 nodes, respectively. Hidden layer-1 and hidden layer-2 are shared across all sessions. Hidden layer-3 and hidden layer-4 are transfer learning layers that are unique to each session.

FIG. 2 shows the architecture of an ANN, according to an embodiment of the subject invention. At time t, the input layer had the data from time t plus four previous time steps. The total number of nodes is 19×5=95 nodes, and each node is connected to all the nodes in hidden layer-1. There are 4 hidden layers of 150, 100, 50, and 30 nodes, respectively. Hidden layer-1 and hidden layer-2 are shared across all sessions. Hidden layer-3 and hidden layer-4 are transfer learning layers that are unique to each session. The input layer of the ANN can be the time series of hand gestures with 19 dimensions. The output of the ANN can be the neuron firing rates (e.g., monkey neuron firing rates if monkeys are used as the subjects for which the ANN training data were gathered). There can be four hidden layers between the input and output (e.g., with 150, 100, 50, and 30 nodes, respectively). All the hidden layers can be fully connected. The activation function in each layer can be, for example, a hyperbolic tangent sigmoid transfer function.

Because the numbers and types of neurons in each session were different (and are different for the end-user in practice across many days of iBCI use), the ANN can emulate firing rates of various dimensions from different sessions. Instead of training one network for one session, the ANN can be trained with the technique of transfer learning. The first two hidden layers can be used as the shared layers to capture the general dynamics and replace the last two hidden layers to capture the session specific dynamics. The first two hidden layers can be trained constantly, and the last two hidden layers may be only trained with the associated session. The weights of hidden layer-1 and hidden layer-2 can be updated in the training of all the sessions whereas the weights of hidden layer-3 and hidden layer-4 may be only updated in the training of the associated session. Scaled conjugate gradient backpropagation can be used to train the ANN on the loss function of mean absolute error. The training of one session can be terminated when the performance gradient is smaller than a predetermined value (e.g., $10^{-6}$) or after a predetermined training epoch (e.g., after training 200 epochs). A round of training can be to train all sessions (e.g., 22 sessions) at once, and the order of the sessions can be randomized in one round. The network can be trained for many rounds (e.g., 1000 rounds or at least 1000 rounds), and the round with the minimum mean absolute error can be selected as the final ANN. All the hyper parameters reported were tuned by grid search to have the best training performance.

Embodiments of the subject invention address the technical problem of developing decoders for iBCIs that do not require invasive implantation in the subject(s) by providing systems, methods, and protocols that utilize a motion capture system (e.g., a data glove) and an ANN to develop iBCI decoders non-invasively by using emulated brain data.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 3:
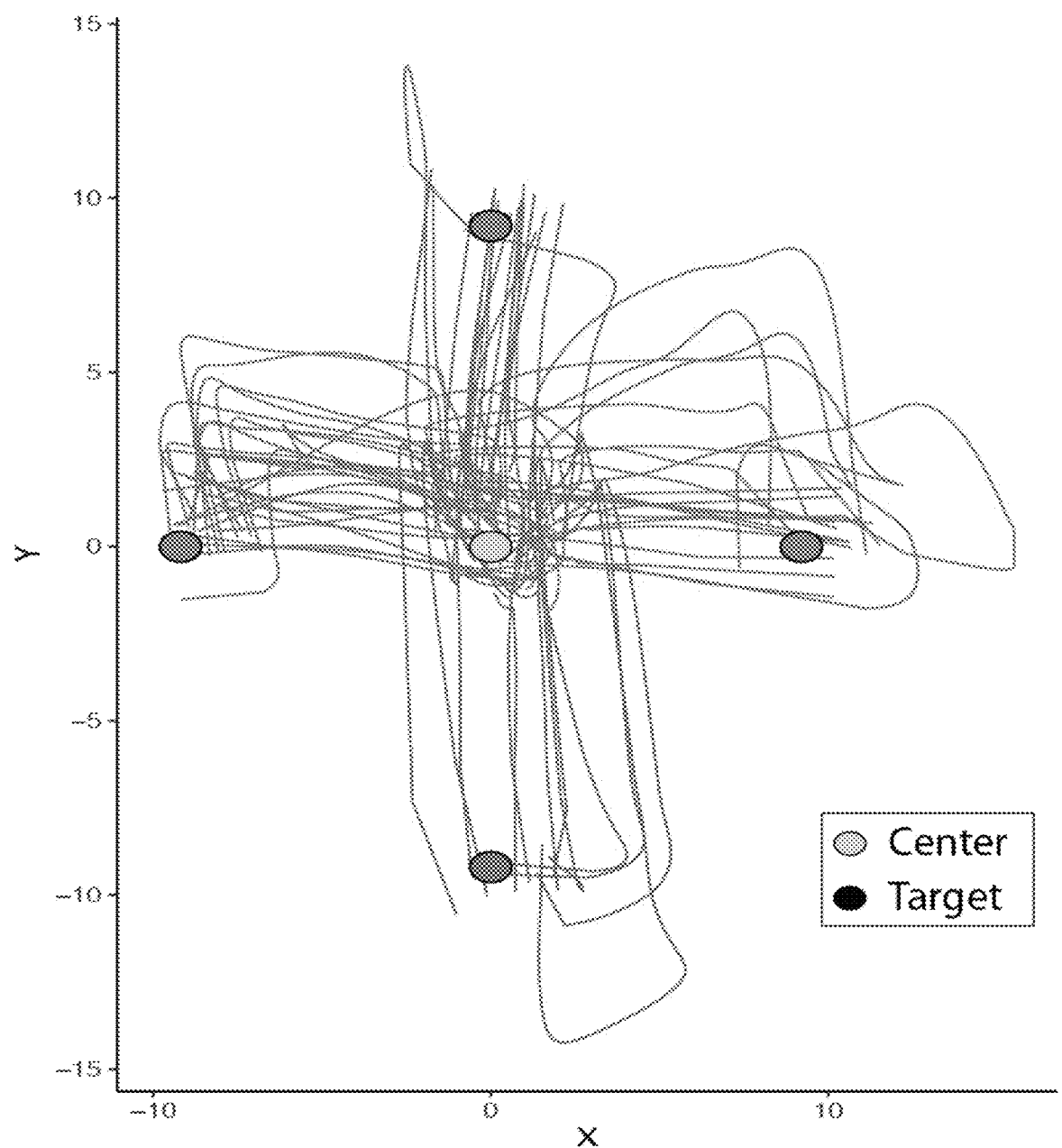
FIG. 3 shows a plot of example trajectories of a cursor control experiment, according to an embodiment of the subject invention. Participants moved the cursor from the center to one of the targets for multiple trials. The colors of the trajectories and the targets were coded correspondingly. The plot shows that the participants were able to control the cursor toward the target.

In order to test if a user can control an external device by using a system as shown in FIG. 1 (with an ANN as disclosed herein), 25 participants were recruited to perform a computer-based experiment. Each participant wore a data glove to control a computer cursor on the screen. The task was to move the cursor from the center of the screen to four targets. FIG. 3 shows an example of the cursor trajectories from one participant.

The decoder translated emulated firing rates to control commands. In this experiment, a velocity Kalman filter decoder was selected as the algorithm of the decoder. The velocity Kalman filter decoded the firing rates to the x and y velocity of the cursor. The velocity Kalman filter is a common decoder in brain-computer interfaces that suits the goal of the experiment.

Participants performed the same task on four different days. On each day, the participant calibrated the decoder before performing the cursor control task. The calibration process customized the parameters of the velocity Kalman filter for each participant, such that it improved the overall decoding performance. After the calibration, the participants performed 80 trials of the cursor control task, 20 trials for each of the four targets. The location of the target was set randomly.

All the participants were able to control the cursor between the center and the targets. FIG. 3 shows an example of the trajectories for one participant from one day of the experiment. FIG. 3 demonstrates that the emulated neuron firing rates were not random signals. The decoder could translate the emulated firing rates to control commands to manipulate the cursor in the same way human subjects with invasively implanted electrodes control cursors in lab studies via direct link to their actual neurons.

With the promising results of the human experiment, it can be seen that embodiments of the subject invention can be used to test different decoders. The same experiment could be conducted with a different decoder to compare the task performance, and the decoder with better performance could be applied to brain-computer interface applications.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for non-invasively developing a decoder of an invasive brain computer interface (iBCI), the system comprising:
    a motion capture device;
    a processor in operable communication with the motion capture device; and
    a machine-readable medium in operable communication with the processor and having instructions stored thereon that, when executed by the processor, perform a plurality of steps including:
        receiving kinematic data of a user from the motion capture device;
        utilizing an artificial neural network (ANN) to generate emulated neuron firing rates associated with the kinematic data; and
        translating the emulated neuron firing rates to corresponding control commands for an external device of the iBCI, thereby obtaining the decoder,
    the ANN being a trained ANN that has been trained using training kinematic data and real neuron firing rates associated with the training kinematic data,
    the ANN comprising an input layer, an output layer, and four hidden layers,
    the input layer comprising 95 nodes,
    the four hidden layers comprising a first hidden layer, a second hidden layer, a third hidden layer, and a fourth hidden layer,
    the first hidden layer comprising 150 nodes,
    the second hidden layer comprising 100 nodes,
    the third hidden layer comprising 50 nodes,
    the fourth hidden layer comprising 30 nodes.

2. The system according to claim 1, the motion capture device being a data glove, and
    the kinematic data comprising hand gesture kinematic data of the user.

3. The system according to claim 1, the kinematic data being real-time kinematic data of the user using the motion capture device.

4. The system according to claim 1, the training kinematic data comprising data from at least 20 different training sessions.

5. The system according to claim 1, the training kinematic data being training hand gesture kinematic data.

6. The system according to claim 5, the training hand gesture kinematic data comprising data for at least eight different hand gestures, and
the real neuron firing rates being respectively associated with the at least eight different hand gestures.

7. The system according to claim 1, further comprising the external device of the iBCI,
the external device being a robot arm, a wheelchair, a keyboard, a smart device, or a computer.

8. A method for non-invasively developing a decoder of an invasive brain computer interface (iBCI), the method comprising:
using, by a user, a motion capture device to capture kinematic data of the user;
receiving, by a processor in operable communication with the motion capture device, the kinematic data of the user;
utilizing, by the processor, an artificial neural network (ANN) to generate emulated neuron firing rates associated with the kinematic data; and
translating, by the processor, the emulated neuron firing rates to corresponding control commands for an external device of the iBCI, thereby obtaining the decoder,
the ANN being a trained ANN that has been trained using training kinematic data and real neuron firing rates associated with the training kinematic data,
the ANN comprising an input layer, an output layer, and four hidden layers,
the input layer comprising 95 nodes,
the four hidden layers comprising a first hidden layer, a second hidden layer, a third hidden layer, and a fourth hidden layer,
the first hidden layer comprising 150 nodes,
the second hidden layer comprising 100 nodes,
the third hidden layer comprising 50 nodes,
the fourth hidden layer comprising 30 nodes.

9. The method according to claim 8, the motion capture device being a data glove, and
the kinematic data comprising hand gesture kinematic data of the user.

10. The method according to claim 8, the kinematic data being real-time kinematic data of the user using the motion capture device.

11. The method according to claim 8, the training kinematic data being training hand gesture kinematic data.

12. The method according to claim 8, the training kinematic data comprising data from at least 20 different training sessions.

13. The method according to claim 11,
the training hand gesture kinematic data comprising data for at least eight different hand gestures, and
the real neuron firing rates being respectively associated with the at least eight different hand gestures.

14. The method according to claim 8, further comprising providing the corresponding control commands to the external device of the iBCI,
the external device being a robot arm, a wheelchair, a keyboard, a smart device, or a computer.

15. A system for non-invasively developing a decoder of an invasive brain computer interface (iBCI), the system comprising:
a motion capture device;
a processor in operable communication with the motion capture device;
an external device of the iBCI in operable communication with the processor; and
a machine-readable medium in operable communication with the processor and having instructions stored thereon that, when executed by the processor, perform a plurality of steps including:
receiving real-time hand gesture kinematic data of a user from the motion capture device;
utilizing an artificial neural network (ANN) to generate emulated neuron firing rates associated with the real-time hand gesture kinematic data; and
translating the emulated neuron firing rates to corresponding control commands for the external device of the iBCI, thereby obtaining the decoder,
the motion capture device being a data glove,
the ANN being a trained ANN that has been trained using training hand gesture kinematic data and real neuron firing rates associated with the training hand gesture kinematic data,
the training hand gesture kinematic data comprising data from a plurality of different training sessions,
the training hand gesture kinematic data comprising data for at least eight different hand gestures,
the real neuron firing rates being respectively associated with the at least eight different hand gestures,
the ANN comprising an input layer, an output layer, a first hidden layer, a second hidden layer, a third hidden layer, and a fourth hidden layer,
the input layer comprising 95 nodes,
the first hidden layer comprising 150 nodes,
the second hidden layer comprising 100 nodes,
the third hidden layer comprising 50 nodes,
the fourth hidden layer comprising 30 nodes, and
the external device being a robot arm, a wheelchair, a keyboard, a smart device, or a computer.

* * * * *